US012694380B2

(12) United States Patent
Song et al.

(10) Patent No.: US 12,694,380 B2
(45) Date of Patent: Jul. 28, 2026

(54) IDENTIFYING TRANSACTION DATA HAVING OVERLAPPING DATA POINTS USING NODAL DATA STRUCTURES

(71) Applicant: Stripe, LLC, San Francisco, CA (US)

(72) Inventors: Guanglei Song, Belmont, CA (US);
Stephen Chen, Oakland, CA (US);
Hanhan Xiang, Bellevue, CA (US)

(73) Assignee: Stripe, LLC, San Francisco, CA (US)

( * ) Notice: Subject to any disclaimer, the term of this patent is extended or adjusted under 35 U.S.C. 154(b) by 0 days.

(21) Appl. No.: 18/345,482

(22) Filed: Jun. 30, 2023

(65) Prior Publication Data

US 2025/0005543 A1     Jan. 2, 2025

(51) Int. Cl.
G06Q 20/10         (2012.01)
(52) U.S. Cl.
CPC ..................................... G06Q 20/10 (2013.01)
(58) Field of Classification Search
USPC ........................................................ 705/39
See application file for complete search history.

(56) References Cited

U.S. PATENT DOCUMENTS

| | | | |
|---|---|---|---|
| 8,682,904 B1 * | 3/2014 | Weber | G06F 16/221 |
| | | | 707/748 |
| 2020/0074565 A1 * | 3/2020 | Dotter | G06F 16/907 |
| 2022/0122092 A1 * | 4/2022 | Ribeiro | G06Q 30/0185 |
| 2022/0398583 A1 * | 12/2022 | Crudele | G06Q 40/125 |

* cited by examiner

*Primary Examiner* — Matthew S Gart
*Assistant Examiner* — Liz P Nguyen
(74) *Attorney, Agent, or Firm* — Foley & Lardner LLP

(57) ABSTRACT

A method for de-duplicating data records may include generating a nodal data structure comprising a set of nodes, in response to receiving a first set of transaction data corresponding to aggregated data associated with a first set of transactions, associating a first subset of nodes with the first set of transaction data, responsive to receiving a second set of transaction data corresponding to aggregated data associated with a second set of transactions and at least a subset of the first set of transactions, associating a second subset of nodes to the first set of transaction data, combining the first subset and the second subset, executing an analytical protocol to identify data associated with the transaction, disassociating the transaction with the first subset, and associating the data associated with the transaction identified via the analytical protocol with the first subset and the second subset.

16 Claims, 8 Drawing Sheets

100

300

Day 1

Day 2

400

Day 1

Day 2

<u>Day 1</u>

Generate a nodal data structure including a set of nodes where each node represents at least one data point associated with transaction data. 710

In response to receiving a first set of transaction data corresponding to aggregated data associated with a first set of transactions, associate a first subset of the set of nodes with the first set of transaction data. 720

Responsive to receiving a second set of transaction data corresponding to aggregated data associated with a second set of transactions and at least a subset of the first set of transactions, associate a second subset of the set of nodes to the first set of transaction data. 730

Receive a request to identify data associated with a transaction from the first set of transactions. 740

Combine the first subset of the set of nodes and the second subset of the set of nodes. 750

Execute an analytical protocol to identify data associated with the transaction. 760

Disassociate the transaction with the first subset of the set of nodes. 770

Associate the data associated with the transaction identified via the analytical protocol with the first subset of the set of nodes and the second subset of the set of nodes. 780

FIG. 7

IDENTIFYING TRANSACTION DATA HAVING OVERLAPPING DATA POINTS USING NODAL DATA STRUCTURES

TECHNICAL FIELD

This application relates generally to methods and systems for generating nodal data structures to identify data associated with transactions.

BACKGROUND

Funds associated with transactions can be received in one or more bank account transfers (BATs) received over multiple days. Funds received in multiple BATs may be incorrectly mapped to transactions or mapped indeterministically to transactions, leading to computing errors. For instance, funds from multiple transactions may be received in a single BAT. A portion of the funds from each transaction may belong to a merchant and another portion of the funds may belong to a processing entity. Funds from a single transaction may be received in multiple BATs received over multiple days. The single transaction may be mapped to the multiple BATs as the BATs are received. This mapping may lead to the funds being double-counted, as a BAT on the first day may appear to be a separate transaction from a BAT received on the second day, even though the BATs are tied to the same transaction. Indeterministically mapped funds across multiple BATs may cause computing errors in determining which portion of funds belongs to the merchant and which portion belongs to the processing entity. Computing errors may cause funds to be mishandled or misdirected. For instance, assigning duplicate or incorrect data to a particular transaction may cause inefficiencies, which is highly undesirable. Deduplication of data may also require additional computing power, which is also undesirable. Moreover, assigning incorrect or supplicate data to a transaction may cause computational inefficiencies and delays for various downstream software applications.

SUMMARY

For the aforementioned reasons, there is a need for systems and methods that provide accurate mapping of transactions to funds received.

A nodal data structure, such as a graph, can be used to track allocations of funds from various transactions to BATs. A transaction can be allocated to multiple BATs that make up a BAT group. The BAT group can be represented in the nodal data structure as a connected component. When allocations of transactions to BATs change, the changed transaction allocations are propagated to the BAT level. The nodal data structure can be changed based on the BAT-level changes to modify BAT groups. The nodal data structure ensures that each transaction is allocated to only one BAT group. In this way, the nodal data structure provides accurate tracking of transactions mapped to BATs and prevents double-counting of transactions.

Because bank servers transmit transaction data in various BATs (e.g., aggregated groups of transaction data), conventional processors using conventional methods cannot efficiently identify different transactions within different BATs. Moreover, certain transactions may be included (or may be partially included) in multiple BATs, which can cause inefficiencies as well. Specifically, a processor attempting to identify different transactions may be required to repeat the same calculations for each BAT multiple times, which is computationally intensive and inefficient. Using the methods and systems discussed herein, a processor can generate a nodal data structure that corresponds to data points associated with different transactions. A processor, such as the analysis server discussed herein, may then execute various analytical protocols to identify different transactions within different nodes (representing different BATs). As a result, the processor may associate and disassociate various nodes, such that inefficacies of conventional systems/methods can be avoided.

For example, a merchant may conduct a transaction with a customer and provide a payment interface of a payment processor to the customer. The customer may execute the transaction and direct funds to be transferred from an account of the customer to an account of the payment processor. The merchant may transmit information associated with the transaction to the payment processor. The payment processor may receive the data associated with the transaction as well as a first BAT from a bank associated with the account of the customer on a first day. The payment processor may generate a nodal data structure, such as a graph including a first node representing the first BAT. The payment processor may map the transaction to the first BAT and determine a portion of the transaction belonging to the payment processor in the form of processing fees. The payment processor may receive a second BAT from the bank associated with the account of the customer on a second day. The payment processor may generate a second node representing the second BAT. The payment processor may map the transaction to the first BAT and the second BAT and connect the first and second nodes. The payment processor may disassociate the transaction from the first node and then associate the transaction with the first and second nodes such that the transaction is accounted for in the nodal data structure once and only once.

Using the methods and systems discussed herein, a processor can accurately map transactions to funds received. Furthermore, using a nodal data structure, the processor can improve the functioning of the computer. By updating the nodal data structure to connect different nodes, the processor can conserve memory and compute resources in calculating values such as a cash balance and a merchant cash amount based on the nodal data structure instead of all of the underlying transaction data and BATs data. By generating and updating the nodal data structure, the processor can calculate amounts of funds based on the updates to the nodal data structure. In an example, the processor can calculate a cash balance of the payment processor and merchant funds based on the nodal data structure. Instead of calculating the cash balance and merchant funds of the payment processor based on every transaction received and every BAT received, the processor can calculate the cash balance and merchant funds based on the nodal data structure, thereby resulting in more accurate data.

In some embodiments, a method may include generating, by a processor, a nodal data structure comprising a set of nodes where each node represents at least one data point associated with transaction data, in response to receiving a first set of transaction data corresponding to aggregated data associated with a first set of transactions, associating, by the processor, a first subset of the set of nodes with the first set of transaction data, responsive to receiving a second set of transaction data corresponding to aggregated data associated with a second set of transactions and at least a subset of the first set of transactions, associating, by the processor, a second subset of the set of nodes to the first set of transaction data, receiving, by the processor, a request to identify data associated with a transaction from the first set of transactions, combining, by the processor, the first subset of the set of nodes and the second subset of the set of nodes, executing, by the processor, an analytical protocol to identify data associated with the transaction, disassociating, by the processor, the transaction with the first subset of the set of nodes, and associating, by the processor, the data associated with the transaction identified via the analytical protocol with the first subset of the set of nodes and the second subset of the set of nodes.

The first set of transaction data may include an indication of a split of funds between two or more entities. The method may include generating additional data based on the first subset of nodes being assigned to the first set of transaction data. The method may include modifying the additional data based on the data associated with the transaction being associated with the first subset of the set of nodes and the second subset of the set of nodes. Modifying the additional data may include reversing at least one calculation performed in generating the additional data. The additional data may include a mapping of an amount of the transaction to the first subset of the set of nodes. Disassociating the transaction with the first subset of the set of nodes may include deleting the mapping of the amount of the transaction to the first subset of the set of nodes. Associating the data associated with the transaction identified via the analytical protocol with the first subset of the set of nodes and the second subset of the set of nodes may include mapping an amount of the transaction to the first and second subset of the set of nodes. Associating the data associated with the transaction identified via the analytical protocol with the first subset of the set of nodes and the second subset of the set of nodes may include connecting at least one node of the first subset of the set of nodes with at least one node of the second subset of the set of nodes. The nodal data structure may include a graph, and connecting the at least one node of the first subset of the set of nodes with the at least one node of the second subset of the set of nodes may include adding, to the graph, an edge connecting the at least one node of the first subset of the set of nodes with the at least one node of the second subset of the set of nodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 5 illustrates an example graph, according to an embodiment.

FIG. 7 illustrates a flowchart depicting operational steps for tracking funds, according to an embodiment.

DETAILED DESCRIPTION

Figure 1:
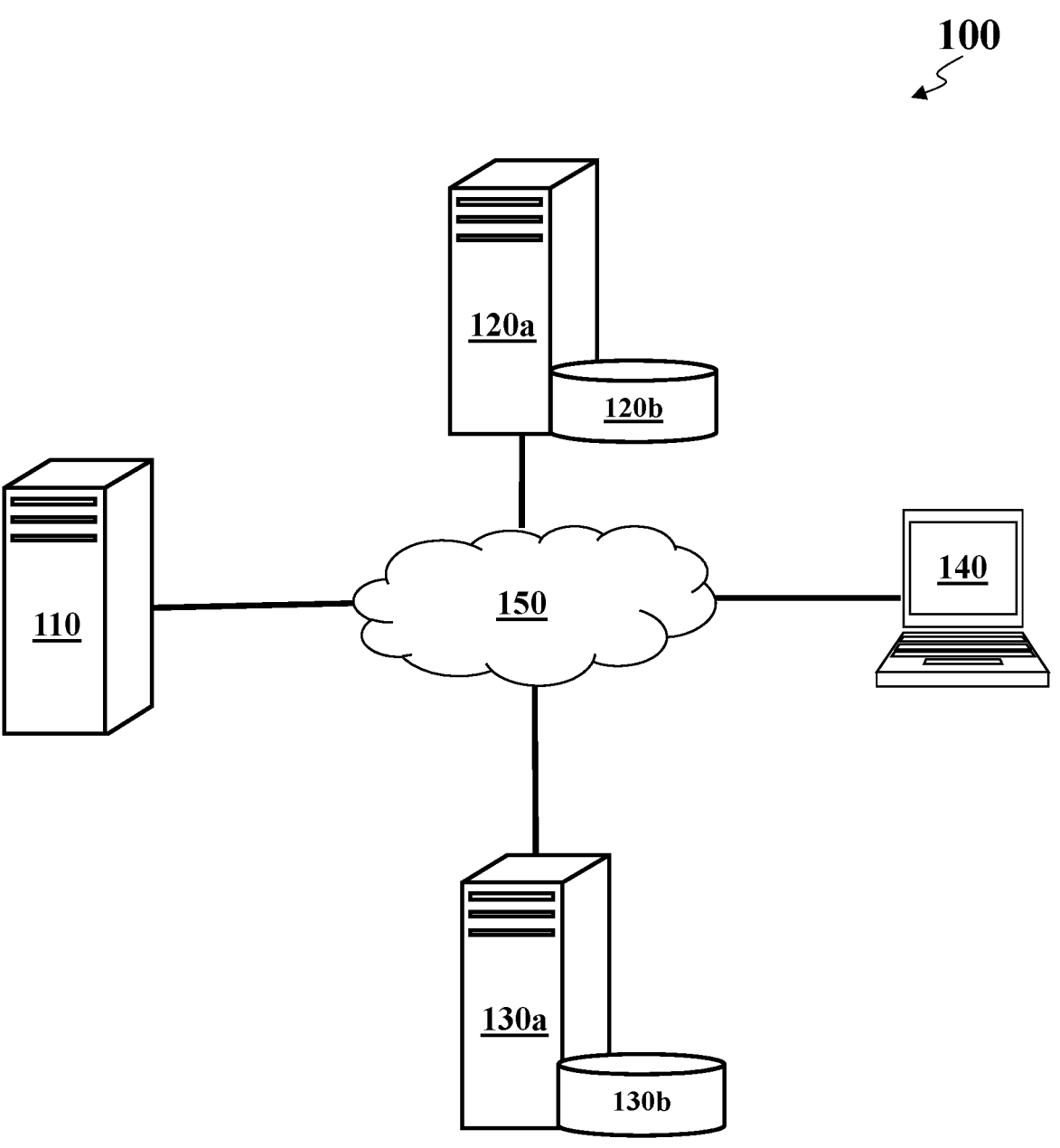
FIG. 1 illustrates a computing system for tracking funds, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates a computing system 100 for tracking funds, according to one or more embodiments. FIG. 1 illustrates different computing devices, such as servers and databases, which communicate to track funds. Computing devices of banks, merchants, payment processing entities, and/or payment tracking entities may communicate to aggregate transaction information. BAT information, and map transactions to BATs. Funds from transactions may be aggregated in one or more BATs, requiring mapping of transactions to the one or more BATs to accurately track the funds from the transactions. The computing system 100 includes an analysis server 110, a merchant server 120a, and a bank server 130a. The analysis server 110 may include one or more processors and a memory. The memory may include a non-transitory, computer-readable medium including instructions which, when executed by the processor, cause the processor to perform functions discussed herein.

The merchant server 120a may include a merchant database 120b. The merchant database 120b may store data associated with a plurality of transactions. The merchant server 120a may transmit the plurality of transactions to the analysis server 110. The analysis server 110 may transmit a request to the bank server 130a to transfer funds based on the plurality of transactions. In some embodiments, the analysis server 110 may request the bank server 130a to transfer funds from an account of a customer of the merchant to an account associated with the analysis server. In some implementations, the bank server 130a may include a plurality of bank servers. In some implementations, the bank server 130a may communicate with other bank servers for the transfer of funds. The analysis server 110 may request the bank server 130a to transfer funds from the account associated with the analysis server to an account associated with the merchant server 120a. In some embodiments, the merchant server 120a includes a plurality of merchant servers each transmitting a plurality of transactions to the analysis server 110. In some implementations, the analysis server 110 may aggregate the transactions to generate aggregate requests for funds. In an example, two customers having accounts at bank A each executes a transaction that is processed by the analysis server. In this example, the analysis server 110 transmits a request to the bank server 130a to transfer funds equal to the sum of the two transactions from bank A to an account associated with the analysis server. In some implementations, the bank server 130a may aggregate the transactions to generate aggregate requests for funds. In an example, two customers having accounts at bank A each executes a transaction that is processed by the analysis server. In this example, the analysis server 110 transmits a request to the bank server 130a to transfer funds equal to the amount of each transaction, and the bank server 130a transfers funds equal to the sum of the transactions from bank A to an account associated with the analysis server.

The bank server 130a may execute one or more bank account transfers (BATs) to transfer funds between accounts and/or between banks. The bank server 130a may execute a single BAT corresponding to funds associated with multiple transactions. The bank server 130a may transfer all funds associated with a transaction in a single BAT. The bank server 130a may transfer a first portion of the funds associated with the transaction in a first BAT and a second portion of the funds associated with the transaction in a second BAT. In some implementations, the bank server 130a may not indicate transactions are associated with a BAT. The analysis server 110 may determine a mapping of funds transferred in a BAT to specific transactions to determine an origin of the funds transferred in a BAT. In some implementations, the analysis server 110 may map a set of transactions to a BAT based at least on an amount of funds of the BAT being equal to an aggregate amount of funds of the set of transactions. The analysis server 110 may use the determined mapping to request transfer of funds from the account associated with the analysis server 110 to the accounts of merchants.

The analysis server 110 may determine a first portion of each transaction belonging to an entity associated with the analysis server and a second portion of each transaction belonging to one or more merchants. In an example, the first portion is fees and commission earned from processing the transaction and the second portion is the payment for the transaction that is the remainder of the amount. The analysis server 110 may use the determined mapping of transactions to BATs to determine a first amount of the funds received in the BATs belonging to the entity associated with the analysis server and a second amount of the funds received in the BATs belonging to the one or more merchants. The analysis server 110 may determine a cash balance of the entity associated with the analysis server based on the first amount. The analysis server 110 may transmit a request to the bank server 130a to transfer the funds to the one or more merchants based on the second amount. If the determined mapping is incorrect, the cash balance and/or the funds transferred to the one or more merchants may be incorrect. The analysis server 110 may aggregate the BATs over a period of days, such that the received BATs on day 1 may be aggregated with the BATs received on day 2 when those BATs correspond to the same transaction. However, one issue with tracing cash allocation to BAT mapping is that it is difficult to keep track of the transactions in the BAT groups.

Figure 2:
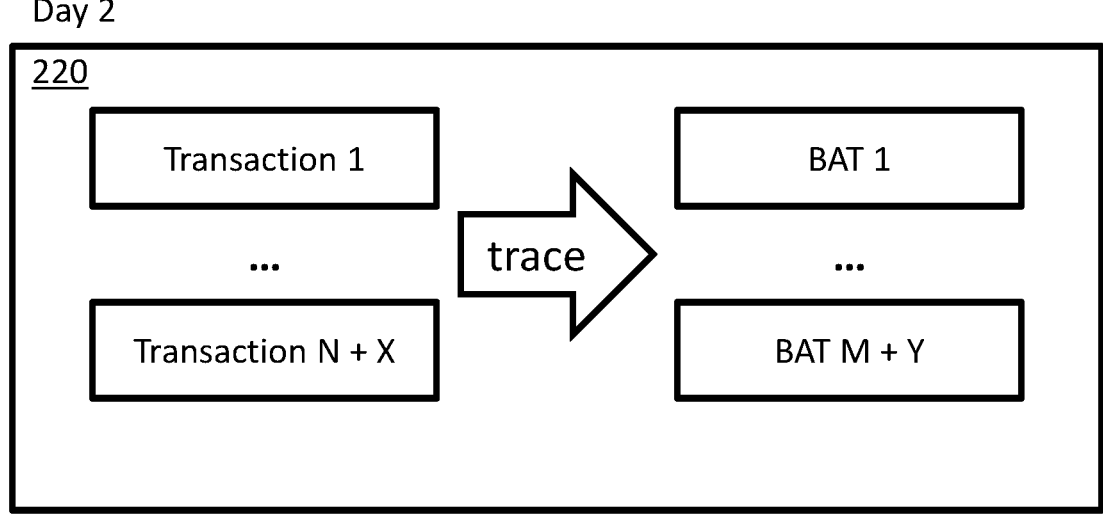
FIG. 2 illustrates mapping transactions to bank account transfers (BATs) over consecutive days, according to an embodiment.

FIG. 2 illustrates mapping transactions to bank account transfers (BATs) over consecutive days. The transactions are mapped to the BATs in order to track funds of each transaction as aggregate funds from multiple transactions are received in the BATs. BATs may be received over several days, with funds from a transaction being received in multiple BATs over multiple days. Transactions may be mapped (or traced) to different BATs on different days, based on new or updated information. On a first day 210, transactions 1 . . . N may be mapped (or traced) to BATs 1 . . . M. One or more transactions of the N transactions may be mapped to one or more of the M BATs on the first day 210. In an example, a first transaction is mapped to a first BAT and a second BAT of the M BATs, and a second transaction is mapped to the second BAT and a third BAT of the M BATs. The N transactions may be received on the first day 210 and/or preceding days. The M BATs may be received on the first day 210 and/or preceding days.

On a second day 220, N+X transactions may be mapped to M+Y BATs. The additional X transactions may be received on the second day 220. The additional Y BATs may be received on the second day 220. The N transactions may be mapped to the M BATs and/or the M+Y BATs. The X transactions may be mapped to the M BATs and/or the M+Y BATs. The mapping of the N transactions to the M BATs may be changed. For example, a transaction of the N transaction may be mapped to a first BAT of the M BATs on the first day 210 and be mapped to the first BAT of the M BATs and a second BAT of the M+Y BATs on the second day 220.

Any number of traced transactions 1 . . . N can be reconciled with one or more BATs (BAT 1 . . . M) on day 1, and then an overlapping set of transactions 1 . . . N+X can be reconciled to multiple BATs (BAT 1 . . . M+Y) at a later point, such as day 2. This mapping may result in the total cash, traced cash, and estimated cash all being incorrect due to double counting transactions. For example, a cash estimate for BAT 1 on day 1 is not properly reversed when a new cash estimate for BAT 1 and BAT2 is being created. Also, the total cash amount of BAT 1 can be double counted, once on day 1 and again on day 2. Also, the cash estimate for BAT 1 and BAT 2 may be given an accounting date of day 2, when BAT 1 should have an accounting date of day 1 and BAT 2 should have an accounting date of day 2.

An incorrect cash tie-out to bank balances may be a multi-dimensional problem. First, transaction level traced cash allocation to BATs mapping may be unstable. For example, as shown in FIG. 2, the BAT group for transaction 1 can change from BAT M to BAT M+Y. It may be desirable to avoid BAT group mapping changes. Second, transaction-BAT group mapping may be maintained at a transaction level. Third, a transaction level merchant/corporate split may be accrued at a BAT group level.

Figure 3:
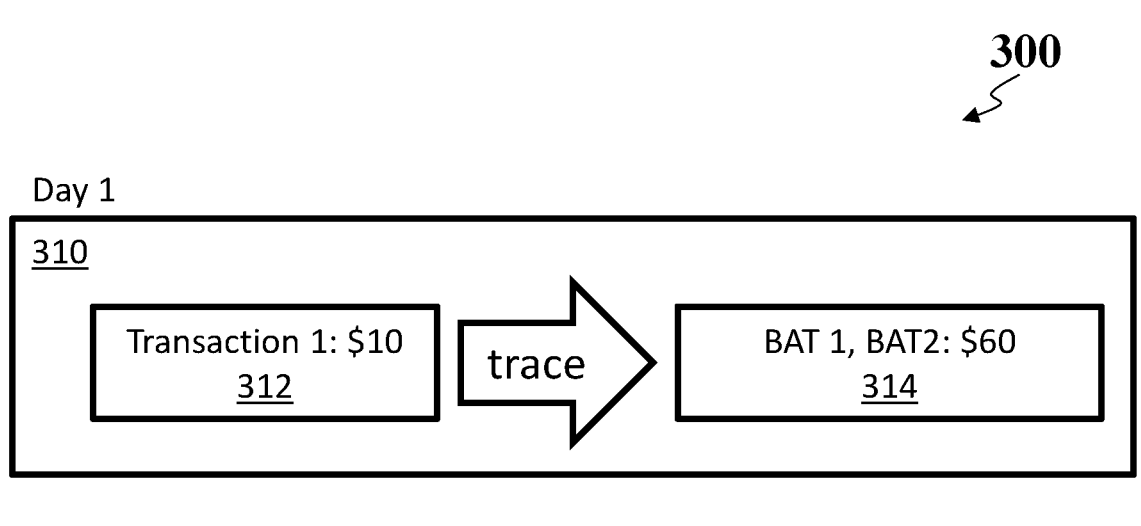
FIG. 3 illustrates an example mapping of transactions to BAT groups over consecutive days, according to an embodiment.
Figure 3:
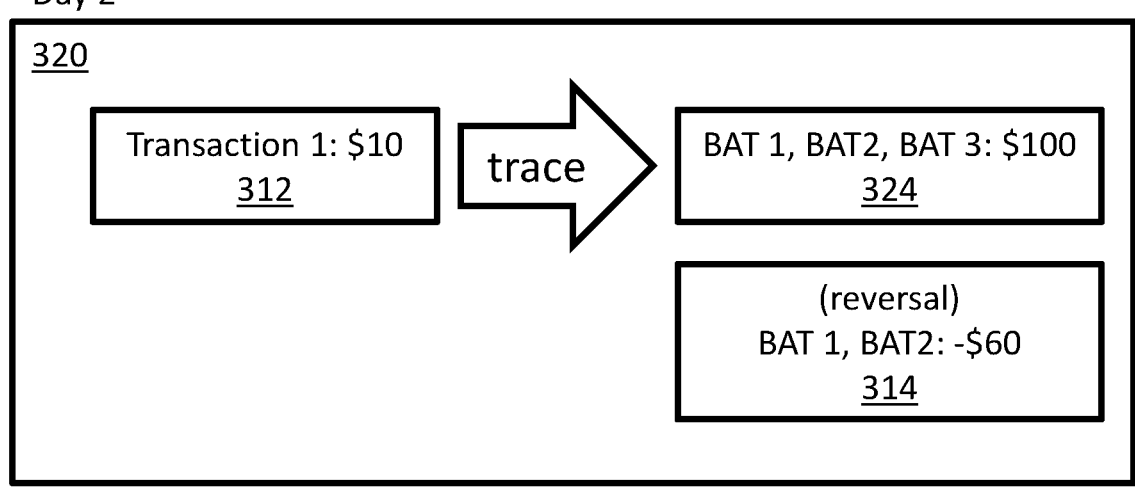

FIG. 3 illustrates an example mapping of transactions to BAT groups over consecutive days. In this example, FIG. 3 illustrates transactions across multiple BATs without using a nodal data structure. FIG. 3 shows how tracking transactions across multiple BATs without using a nodal data structure may still be accurate in situations where an updated mapping of a transaction is propagated to a first group to which the transaction was mapped on a first day and a second group to which the transaction was mapped on a second day. However, tracking transactions across multiple BATs without using a nodal data structure can lead to inaccuracies in other situations, as illustrated in FIG. 4.

The analysis server 110 may receive multiple BATs: a first BAT of $25, a second BAT of $35, a third BAT of $40, and fourth BAT of $50, each comprising multiple transactions. The analysis server 110 may receive a first transaction 312 of $10 and map the first transaction 312 on a first day 310 to a first BAT group 314 including the first BAT and the second BAT. The analysis server 110 may record a total cash balance of the combined first BAT and second BAT in the first BAT group 314 as $60. On a second day 320, the analysis server 110 may adjust the mapping of the transaction 312 to map the transaction 312 to a second BAT group 324 including the first BAT, the second BAT, and the third BAT. The analysis server 110 may adjust the mapping of the transaction 312 based on a first amount of the transaction being received on the first day and a second amount of the transaction being received on the second day. The analysis server 110 may record a total cash balance of the second BAT group 324 including the first BAT, the second BAT, and the third BAT as $100. The analysis server 110 may propagate the mapping of the transaction 312 to the first BAT group 314 and the second BAT group 324. Based on the adjusted mapping of the transaction 312 and the transaction 312 being previously mapped to the combination of the first BAT group 314 and the second BAT group 324, the analysis server 110 may reverse the calculation of the total of the first BAT group 314, such that the transaction 312 is not counted twice in (1) the first BAT group 314 including the first BAT and the second BAT and (2) the second BAT group 324 including the first BAT, the second BAT, and the third BAT. If the transaction 312 were not reversed, the transaction 312 would be counted twice and a total balance calculated using the first BAT group 314 and the second BAT group 324 would be inaccurate by an extra $10.

When the transaction-BAT group mapping changes, the mapping at the transaction level changes and may propagate to the BAT group level. However, this approach may be flawed when the transaction-BAT group mapping at the transaction level has overlap with another BAT group. As described below with respect to FIG. 4, the total balance at the end of day 2 would be incorrect because BAT3 would be stated in two different BAT groups. Further, because a cash split may be tracked at a BAT group level, if individual BATs in the BAT group have different accounting dates, the analysis server selects one of the accounting dates from the BAT group, and it may choose the latest accounting date.

Figure 4:
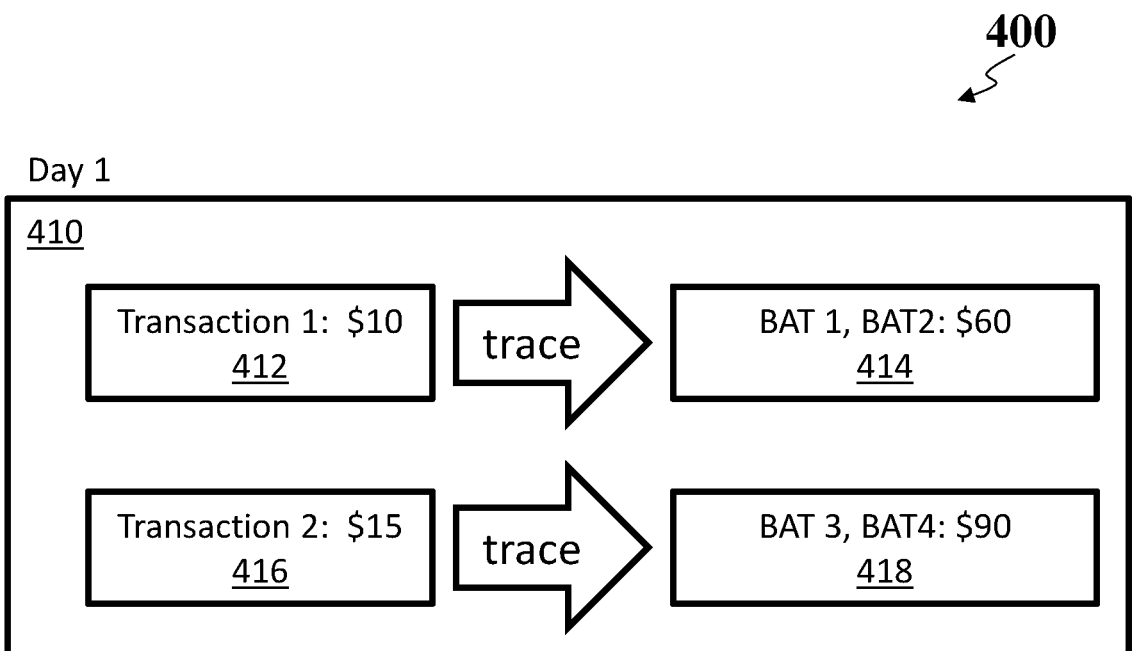
FIG. 4 illustrates another example mapping of transactions to BAT groups over consecutive days, according to an embodiment.
Figure 4:
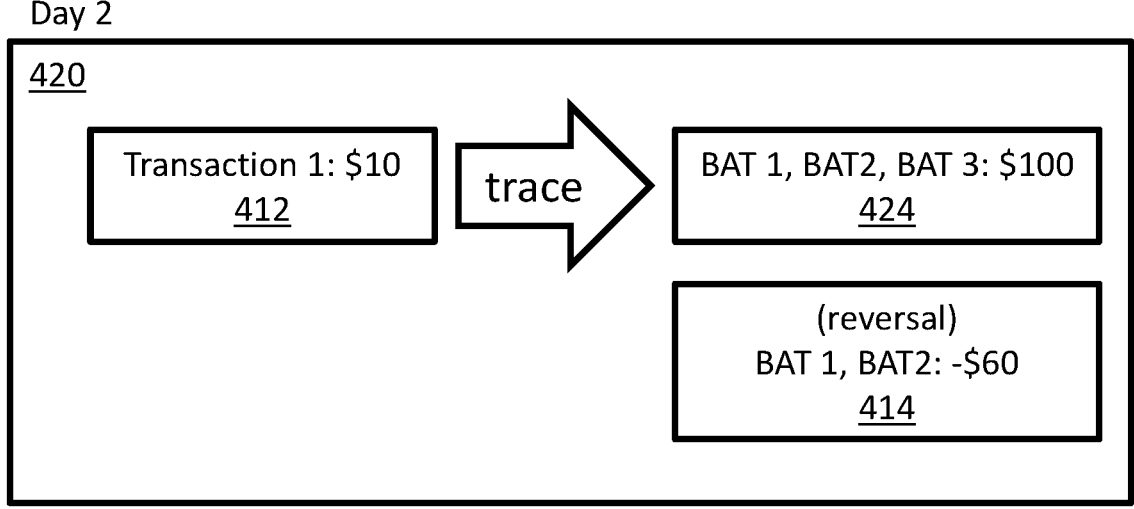

FIG. 4 illustrates another example mapping of transactions to BAT groups over consecutive days. FIG. 4 shows how tracking transactions across multiple BATs without using a nodal data structure can be inaccurate in situations where an updated mapping of a first transaction is propagated to a first BAT group to which the transaction was mapped on a first day and a second BAT group to which the transaction was mapped on a second day. However, propagating the updated mapping of the first transaction to the BAT groups associated with the first transaction does not correct BAT groups not associated with the first transaction. Changing BAT groups without taking into account connections between BATs can lead to inaccuracies. Using a nodal data structure addresses this problem, as illustrated in FIGS. 5 and 6.

The analysis server 110 may receive a first BAT of $25, a second BAT of $35, a third BAT of $40, and fourth BAT of $50. The analysis server 110 may receive a first transaction 412 of $10 and map the first transaction on a first day 410, such that first transaction 412 is included in the $60 of a first BAT group 414 including the first BAT and the second BAT. The analysis server 110 may receive a second transaction 416 of $15 and map the second transaction 416 on the first day 410 to the $90 of a second BAT group 418 including the third BAT and the fourth BAT. The analysis server 110 may record a total of the first BAT group 414 including the first BAT and the second BAT as $60 and a total of the second BAT group 418 including the third BAT and the fourth BAT as $90. On a second day 420, the analysis server 110 may adjust the mapping of the first transaction 412 to map the first transaction 412 to a third BAT group 424 including the first BAT, the second BAT, and the third BAT. Based on the adjustment of the mapping of the first transaction 412 and the first transaction 412 being previously mapped to the first BAT group 414 including the first BAT and the second BAT, the analysis server 110 may reverse the calculation of the total of the first BAT group, such that the first transaction 412 is not counted twice in the first BAT group 414 and the third BAT group 424. However, as the first transaction 412 was not mapped in the first day 410 to the second BAT group including the third BAT and the fourth BAT, the analysis server 110 does not reverse the calculation of the total of the second BAT group 418. Thus, the total of the second BAT group 418 is not changed, and the third BAT is double-counted, being counted in the second BAT group 418 and the third BAT group 424. A total balance calculated using the first BAT group 414, the second BAT group 418, and the third BAT group 424 is thus inaccurate. Calculating a split between merchant cash and payment processor cash using the total balance would similarly be inaccurate.

To accurately map transactions to BATs, the analysis server 110 may generate a nodal data structure, such as a graph, which serves to connect BATs based on mappings of transactions to the BATs. FIG. 5 illustrates how a nodal data structure ensures that connections between BATs are taken into account such that neither transactions nor BATs are double-counted. The nodal graph structure includes connections between BATs, such that changes to transaction mappings are propagated to the BAT level and the BAT group level. The nodal data structure ensures that connections between BATs result in updated BAT groups, using the nodal data structure, and connected components of the nodal data structure which correspond to BAT groups.

The analysis server is configured to more accurately report a cash balance when a BAT group changes and track/report a cash balance change at a BAT level instead of a BAT group level. In the application of a nodal data structure, all of the BATs may form an undirected graph, BAT's may be vertices, and BAT groups may be connected components of BATs. When a new BAT is added to a BAT group, the analysis server may add edges to connect existing BATs on the BAT group to the new BAT. Then, to find all BATs in the updated BAT group, the analysis server identifies all of the vertices (BATs) in the updated connected component (BAT group). The analysis server can also evaluate the nodal data structure to represent a relationship and different algorithms to track connected components.

FIG. 5 illustrates an example graph 500. Although nice nodes are shown in three separate groups, the graph 500 may include any number of nodes in any number of groups. Each node may include or represent a data point. In an example, each node represents an attribute of a transaction. The graph 500 may include millions of nodes, each including or representing a data point. The nice nodes shown may be part of a larger graph including a plurality of nodes. The graph 500 may include a first BAT group 510, a second BAT group 520, and a third BAT group 530. The first BAT group 510 may include a first node 512, a second node 514, and a third node 516. The nodes within the BAT group 510 may be connected to each other via edges, such as a first edge 513 (connecting the first node 512 and the second node 514), a second edge 515 (connecting the first node 512 and the third node 516), and a third edge 517 (connecting the second node 514 to the third node 516). In some implementations, the first BAT group 510 may include any number of nodes and edges.

The second BAT group 520 may include a fourth node 522 (fourth BAT), a fifth node 524 (fifth BAT), and a sixth node 526 (sixth BAT). The nodes within the BAT group 520 may be connected to each other via edges, such as a fourth edge 523 (connecting the fourth node 522 and the fifth node 524), a fifth edge 515 (connecting the fourth node 522 and the sixth node 526), and a sixth edge 527 (connecting the fifth node 524 to the sixth node 526). In some implementations, the second BAT group 520 may include any number of nodes and edges.

Similar to the BAT groups 510 and 520, the third BAT group 530 may include a seventh node 532 (seventh BAT), an eighth node 534 (eighth BAT), and a ninth node 536 (ninth BAT). The nodes within the BAT group 530 may be connected to each other via edges, such as a seventh edge 523 (connecting the seventh node 532 and the eighth node 534), an eight edge 535 (connecting the seventh node 532 and the eighth node 534), and a ninth edge 537 (connecting the eighth node 534 to the ninth node 536). In some implementations, the third BAT group 530 may include any number of nodes and edges.

The first node 512 may represent a first BAT and the second node 514 may represent a second BAT. The analysis server may generate the first node 512 based on receiving the first BAT and the analysis server may generate the second node 514 based on receiving the second BAT. The analysis server may map a transaction to the first BAT and the second BAT. Based on a transaction being mapped to the first BAT and the second BAT, the analysis server may generate the first edge 513 to connect the first node 512 and the second node 514. The transaction may be mapped to the first node 512 and the second node 514 based on the transaction being mapped to the first BAT and the second BAT. The first BAT group 510 may include all connected nodes representing a group of BATs needed to account for funds of one or more transactions. Thus, no edges extend outside of the first BAT group 510.

In a non-limiting example, a first portion of a transaction is received in the first BAT and a second portion of the transaction is received in the second BAT and the transaction is mapped to both the first BAT and the second BAT. Both the first BAT and the second BAT need to be considered to account for the transaction, and so the first node 512 and the second node 514 are connected in the graph by the first edge 513.

Whenever a new BAT is received, a corresponding BAT group may be revised, for instance, via the analysis server adding the appropriate edges to connect the existing BATs to the new BAT. As depicted, when the third BAT is added (e.g., a bank server transmits data corresponding to a third BAT), the analysis server uses the edges 517 and 515 to connect the node 516 (representing the third BAT) with the nodes 512 and 514, representing the first BAT and the second BAT respectively.

When analyzing the data, the funds of the first BAT and the second BAT may be combined in calculating an amount of funds of the first BAT group 510. The first node 512, the second node 514, and/or the third node 516 may each include an amount corresponding to the first BAT, the second BAT, or the third BAT respectively. The first node 512, the second node 514, and the third node 516 may be combined to calculate the amount of funds of the first BAT group 510.

Similarly, the fourth node 522 and the fifth node 524 are connected by the second edge 523 based on at least one transaction being mapped to both the fourth node 522 and the fifth node 524. When the sixth BAT is received, the analysis server uses the edges 527 and 525 to connect the sixth node 526 to the fourth node 522 and the fifth node 524 respectively. The second BAT group 520 includes a group of connected nodes such that no edge extends out of the group. This means that all BATs needed to account for funds of one or more transactions are included in the second group. The analysis server may use a similar method to connect nodes corresponding to the seventh, eighth, and ninth BATs within the third BAT group 530.

Representing the data via the nodal data structure (graph) discussed herein may allow the analysis server to analyze the data in a more efficient manner. First, connecting data points within BATs may be computationally intensive and may generate redundant data records, which can lead to computational inefficiencies. In contrast, associating or disassociating nodes via the nodal data structure may allow the analysis server to identify/access pertinent data using less computing power. Specifically, tracking/identifying data associated with connected nodes (within a nodal data structure) requires less computing power than tracking raw data (e.g., BATs).

Moreover, generating the nodal data structure (graph) discussed herein, allows the analysis server to efficiently connect nodes representing BATs in different BAT groups. In some implementations, the first BAT group 510, the second BAT group 520, and the third BAT group 530 may be determined in a first time interval (e.g., a first day). The graph 500 may be updated and the first BAT group 510, the second BAT group 520, and the third BAT group 530 may be updated based on an updated mapping received in a second time interval (e.g., a second day). The graph 500 may be updated based on the updated mapping, a new BAT, new transactions, and/or corrected transactions.

An example of the graph 500 modified in the second time interval is shown in FIG. 6 (graph 501). In an example, the first BAT group 510, the second BAT group 520, and the third BAT group 530 are determined on a first day and updated on a second day. The first BAT group 510, the second BAT group 520, and the third BAT group 530 may be determined on a first day based on transactions received on the first day and mapped to BATs on the first day, and then updated on a second day based on additional transactions and/or a new mapping.

When a new connection between transactions included in different BATs or BAT groups is identified, the analysis server may connect the corresponding nodes, regardless of their BAT groupings. This allows the system to accurately track and report cash balance changes at the BAT level instead of BAT grouping levels. For instance, new edges can be dynamically created that connects nodes representing different BATs that belong to different groups. In this way, the analysis server may no longer need to move the underlying data. Instead, the edges can connect the appropriate nodes and create a logical connection allowing the suitable data to be segmented. Specifically, creating new edges allows the analysis server to efficiently retrieve data. For instance, the analysis server may connect nodes 512, 514, and 516 to the node 522 via edges 540, 542, and 544 respectively. The analysis server may sometimes combine the corresponding BAT groups as well. For instance, the paradigm depicted in FIG. 6A illustrates that the BAT groups can be combined (also referred to as the connected paradigm) while the paradigm depicted in FIG. 6B illustrates that different BATs can remain in their respective BAT groups while new edges can connect the underlying data (also referred to as the disjointed paradigm).

Figure 6A:
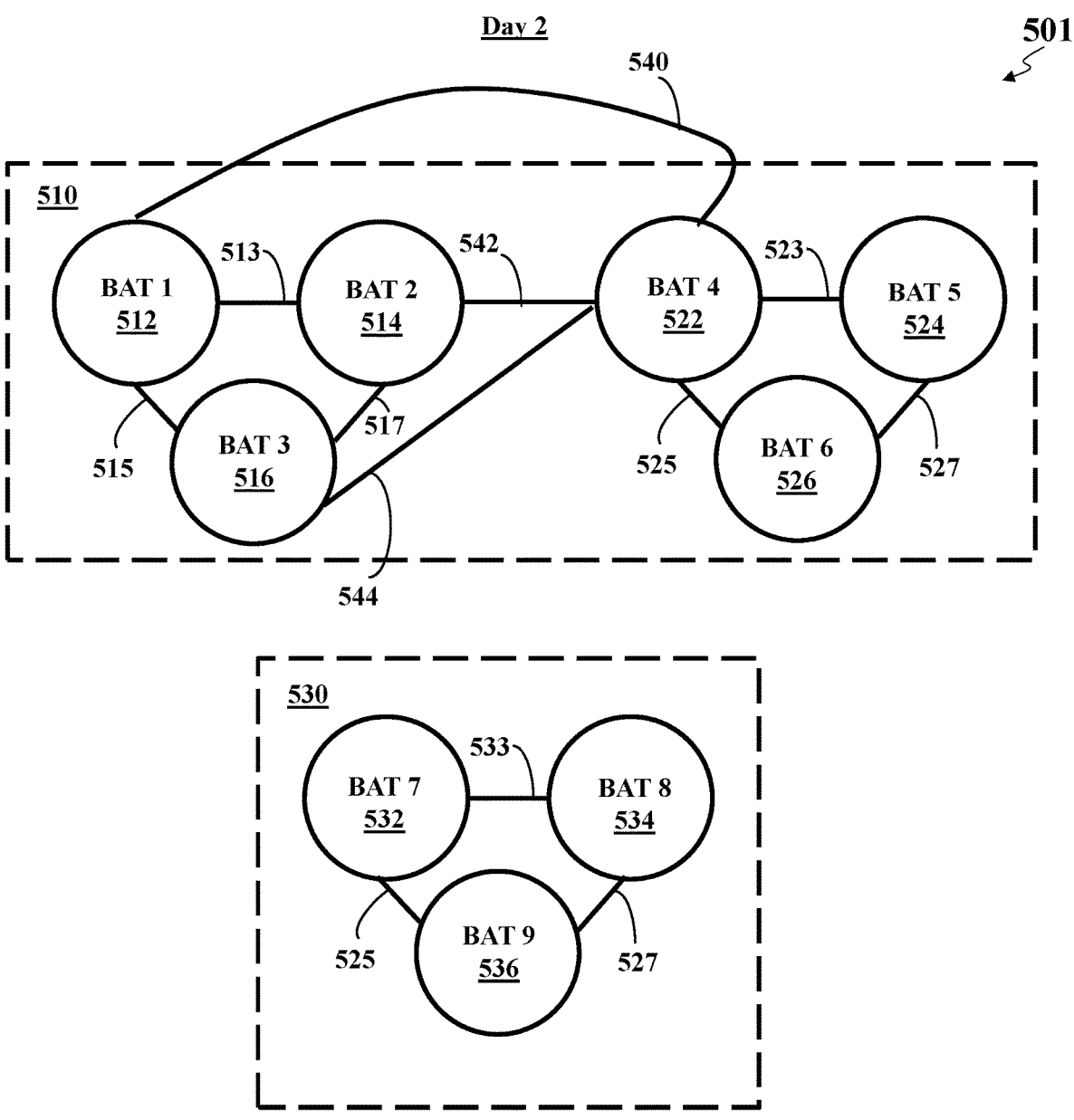
FIGS. 6A-6B illustrate different examples of the graph of FIG. 5, modified to connect the first subset of nodes and the second subset of nodes, according to one or more embodiments.
Figure 6B:
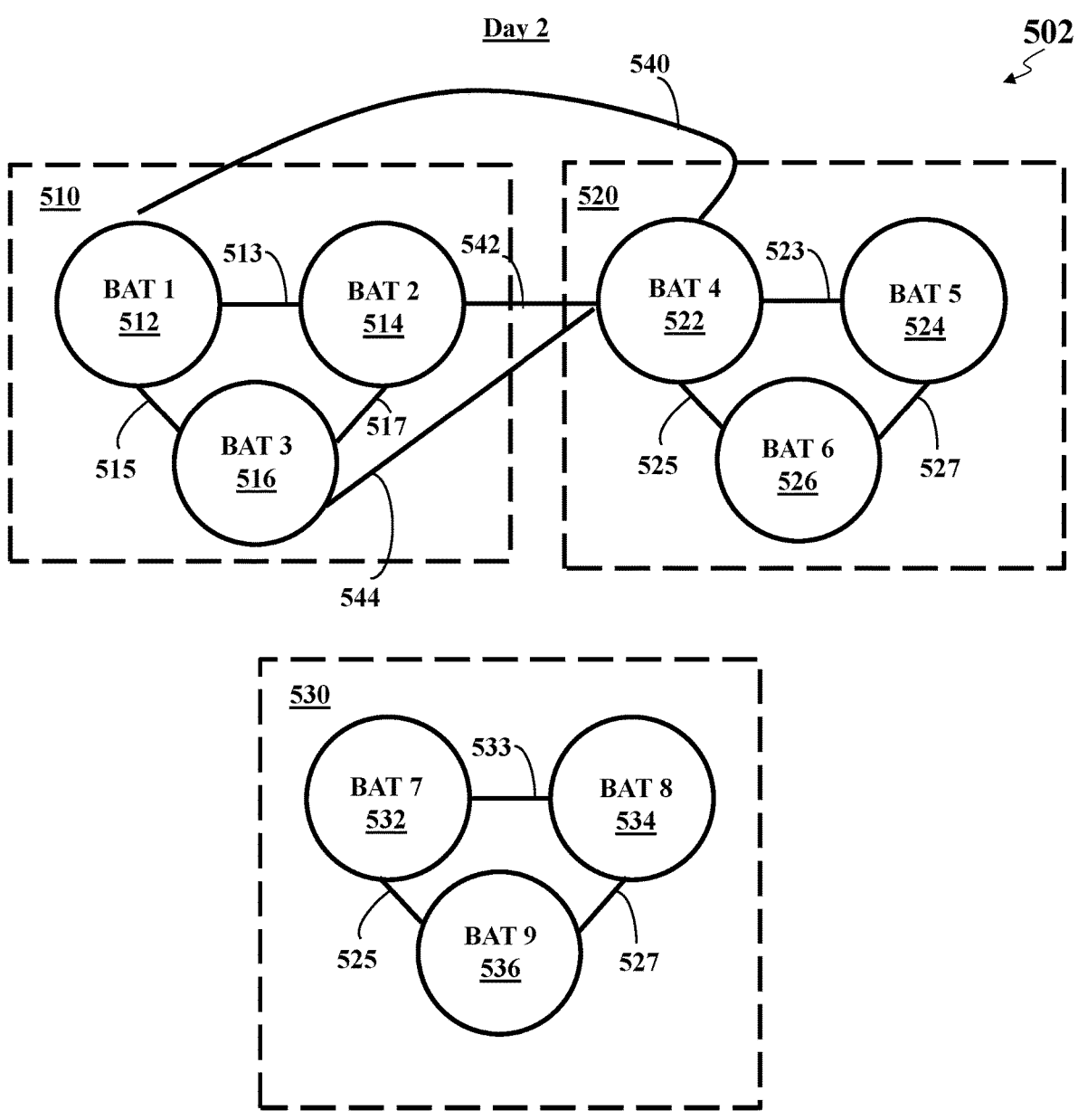

FIG. 6A illustrates a graph 501, which is a modified version of the graph 500 of FIG. 5. Specifically, the graph 500 may be modified to connect the first BAT group 510 and the second BAT group 520. FIG. 6A shows the first BAT group 510 combined with the second BAT group 520 such that the fourth node 522 and the fifth node 524 are a part of the first BAT group 510. In some implementations, the first BAT group 510 and the second BAT group 520 may be combined such that the first node 512, the second node 514, and the third node 516 are a part of the second BAT group 520. In some implementations, the first BAT group 510 and the second BAT group 520 may be combined to generate a new group.

The analysis server may determine, in a second time interval (e.g., a second day), that a transaction is mapped to the second node 514 and the fourth node 522. The analysis server may determine that the transaction is mapped to the second node 514 and the fourth node 522 based on an updated mapping of the transaction to the second node 514 and the fourth node 522. Based on the transaction being mapped to both the second node 514 and the fourth node 522, the analysis server may generate a new edge 542 connecting the second node 514 and the fourth node 522. Based on the second node 514 and the fourth node 522 being connected by the new edge 542, the analysis server may add the fourth node 522, the fifth node 524, and the sixth node 526 of the second BAT group 520 into the first BAT group 510.

With the second BAT group 520 combined with the first BAT group 510, the first BAT group 510 includes all nodes needed to account for funds of all transactions mapped to each of the first through sixth nodes 512, 514, 516, 522, 524, and 526. The second BAT group 520, when combined with the first BAT group 510 may cease to exist as a separate group. To identify all nodes which need to be considered for allocating all funds of a specific transaction, one or more algorithms may be used to identify the first BAT group 510.

In an alternative embodiment, the analysis server may connect various nodes (using different edges) without combining different BAT groups. For instance, FIG. 6A illustrates the graph 500 of FIG. 5, updated to reflect the connections between the BATs and the resultant connections between BAT groups. FIGS. 6A-B show the same connection between the same nodes. However, the graph 503 includes separate BAT groups being connected via edges. By using the nodal data structure discussed herein, BAT groups are automatically tracked in the logic of the nodal data structure, such that changes to transaction mappings correctly propagate to the BAT group level.

The analysis server may calculate the split of funds between the payments processor and the merchants on a daily basis as new transactions and BATs are received. One way of calculating the split of funds is to determine a split of funds or ratio between payments processor cash and merchant cash for a BAT group, and then apply that ratio to each BAT in the BAT group. In this way, the split of funds is calculated for each BAT.

In a non-limiting example, the analysis server may modify the cash balance and the merchant funds in the second time interval based on the modified graph 500 (e.g., 501 or 502). The analysis server may modify the cash balance and the merchant funds at regular intervals, based on new transactions, new BATs, and updated mappings of transactions to BATs. In an example, the analysis server modifies the cash balance and the merchant funds on a daily basis. In some implementations, the analysis server determines a cash balance/merchant funds ratio for each of the first BAT group 510 and the third BAT group 530. The analysis server may apply the determined ratio of the first BAT group 510 to each of the nodes of the first BAT group 510 and the determined ratio of the third BAT group 530 to each of the nodes of the third BAT group 530. The analysis server may estimate an amount of funds contributing to the cash balance and an amount of funds contributing to the merchant funds in the first node 512 based on applying the ratio of the first BAT group 510 to an amount of the first node 512. In an example, the analysis server may determine that 5% of the funds of the first group are cash balance and 95% are merchant funds. In this example, the analysis server may apply the ratio of 5:95, or 1:19 to the first node 512 to estimate that 5% of the funds of the first node 512 are cash balance and 95% are merchant funds.

The analysis server may determine the cash balance and the merchant funds by modifying a previously determined cash balance and merchant funds based on the updated graph 500. This preserves memory and computing resources and can be accomplished more quickly than recalculating the cash balance and merchant funds. The analysis server may disassociate a transaction from the first BAT group 510 including the first node 512 and the second node 514, combine the first BAT group 510 and the second BAT group 520, and then associate the transaction with the first BAT group 510 including the first node 512, the second node 514, the fourth node 522, and the fifth node 524. This ensures that the transaction is not double-counted.

In some embodiments, the analysis server may use a "union-find" algorithm to identify the pertinent data and connect (via edges discussed herein) the corresponding nodes. Specifically, the union-find algorithm may perform two distinct actions. Using this algorithm, the analysis server may determine which subset of data includes or corresponds to a particular element (transaction). This can be used for determining if two elements are in the same subset of the received data (e.g., different BATs). Additionally, using this algorithm, the analysis server may join the two subsets into a single subset. When two nodes (each representing different BATs or at least a portion of a BAT) are determined to be related to the same element (e.g., transaction) can be connected to each other, e.g., by creating a new set of data.

The "union-find" algorithm, also known as the disjoint-set data structure, may be implemented to efficiently manage the collection of disjoint data sets (e.g., different nodes within the nodal data structure). Specifically, after assigning different nodes to different BATs, the nodal data structure (prior to having edges) may be treated as a disjointed dataset. Using the "union-find" algorithm, the analysis server can identify which nodes (each representing a subset of the data) are related and should be connected to each other. Using the "union-find algorithm," the analysis server can determine whether two elements are in the same subset of the data. Therefore, when different subsets of the data are identified to be pertinent to the same transaction, the analysis server may traverse the nodal data structure to identify a root of the pertinent data and generate a new dataset that includes all the relevant data (the originally identified subsets of the data in addition to the root or other relevant datasets).

In some embodiments, implementing the "union-find" algorithm may first include determining the representative element (also called the "root" or "parent"). The analysis server may use a mapping function to match strings of data to a predetermined string representing a particular transaction. Once a node is mapped to a transaction, the analysis server may identify a node identifier. Subsequently, the analysis server may find a parent for the identified node (e.g., the analysis server may use other nodes that are connected to the identified node having the node identifier). The analysis server may then reconfigure an identifier for all the nodes into a new identifier. For instance, all the node identifiers may be changed by updating the parent identifiers. As a result, the analysis server may merge the identified datasets (pertinent to the transaction) into a single dataset. This operation may combine the datasets by linking the root of one set to the root of the other set.

In some embodiments, the analysis server may use a path compression method to increase efficiencies. Path compression may involve flattening the tree-like structure of the identified nodes and reducing future traversal time. This protocol allows for more efficiency.

Additionally or alternatively to implementing the "union-find" algorithm, the analysis server may use a "connected component" algorithm. Using this method, the analysis server may use a library that has support for graphs and graph-parallel computation. Using the "connected components" algorithm of the library, the analysis server can approximate the same operations as using the union-find" algorithm.

The analysis server may implement the "connected component" algorithm and calculate a new settled cash output. As used herein a "connected component" algorithm may refer to a method used to identify and extract the connected components in a nodal data structure or a graph. Specifically, the analysis server may first identify a previous (e.g., from a different time window, such as yesterday) status of every BAT and compare the previous status of each BAT to a current status (e.g., BAT status given transaction data for a new time window, such as today's transactions) of a corresponding BAT. In order to identify the BAT status (previous or current) in light of the dynamic change discussed herein (e.g., new transactions), the analysis server may first add an "anchor" BAT in transaction level output. The anchor BAT may be immutable. However, the analysis server may monitor the anchor BAT by sorting the BATs using various attributes, such as BAT identifiers or "traced day" identifiers (e.g., identifying/tracing each BAT). Alternatively, the analysis server may monitor the anchor BAT by searching for any BAT having a group change.

Subsequently, the analysis server may group all settled cash transaction level output objects into a single BAT. This protocol may be performed regardless of how it would affect different BAT groups. Because the analysis server has determined BAR identifiers and their corresponding BAT groups and has also traced the anchor BATs, the analysis server may calculate BAT summaries for different BATs.

The analysis server may use either or both "union-find" or "connected component" algorithms. This allows the analysis server to monitor different BATs as new data is received. If needed, the analysis server may switch between the two algorithms discussed herein or may use a complementary method/algorithm. For instance, the analysis server may use the "union-find" method and may switch to the "connected component" method when data bottlenecks are encountered.

In a non-limiting example, the first BAT group 510 has a total of $100, the second BAT group 520 has a total of $100, and a transaction in the first BAT group 510 has a total of $50. In an updated mapping, the transaction is mapped to the first BAT group 510 and the second BAT group 520. In combining the first BAT group 510 and the second BAT group 520, the totals of the first BAT group 510 and the second BAT group 520 are added. In order to avoid double-counting the transaction and erroneously giving the first BAT group 510 combined with the second group a total of $250, the transaction is disassociated from the first BAT group 510 such that the first BAT group 510 has a total of 50. The first BAT group 510 and the second BAT group 520 are combined to have a total of $150. The transaction is associated with the first BAT group 510 and the second BAT group 520 to give the combined first BAT group 510 a total of $200.

The following non-limiting example describes how the analysis server may use the methods and systems (e.g., nodal data structure) discussed herein to analyze transaction data received in BATs.

In some implementations, the graph 500 as shown in FIG. 5 is the graph 500 on a first day and the graph 501 or 502 as shown in FIGS. 6A-B are the graph on a second day. On the first day, the analysis server may receive a first set of transactions and map those transactions to BATs using a first mapping. The analysis server may generate the first mapping on the first day using the transactions received on the first day and prior days. The analysis server may generate the graph 500 and the first BAT group 510, the second BAT group 520, and the third BAT group 530 as shown in FIG. 5 on the first day based on the first set of transactions mapped to the nodes 512, 514, 516, 522, 524, 526, 532, 534, and 536.

At least one transaction of the first set of transactions is mapped to the first node 512, the second node 514, and the third node 516, resulting in the first node 512, the second node 514, and the third node 516, being in the first BAT group 510. At least one transaction of the first set of transactions is mapped to the fourth node 522, the fifth node 524, and the sixth node 526, resulting in the fourth node 522, the fifth node 524, and the sixth node 516 being in the second BAT group 520. At least one transaction of the first set of transactions is mapped to the seventh node 532, the eighth node 534, and the ninth node 536 resulting in the seventh node 532, the eighth node 534, and the ninth node 536 being in the third BAT group 530.

On the second day, the analysis server may receive a second set of transactions and map those transactions to the BATs using a second mapping. The analysis server may generate the first mapping on the first day using the transactions received on the second day, the first day, and the prior days. In some implementations, at least one transaction of the first set of transactions has a different mapping in the second mapping than in the first mapping. The second mapping may be generated in response to the at least one transaction of the first set of transactions having a different mapping in the second mapping than in the first mapping. The analysis server may modify the graph 500 on the second day based on the second mapping to obtain the graph 501 or 502 as shown in FIGS. 6A-B.

In some implementations, the analysis server may receive additional transactions, mapping data, and/or BATs on a daily basis, generate new mappings on a daily basis, and modify the graph based on the new mappings on a daily basis. In some implementations, the analysis server may generate additional data, such as the cash balance and the merchant cash, on a daily basis based on the graph 500 and/or the day-by-day changes to the graph 500. In some implementations, the analysis server generates a graph summary on a daily basis based on the graph 500, the graph summary including the cash balance and the merchant cash, and calculates differences between graph summaries of subsequent days.

In a non-limiting example of implementation of the methods and systems discussed herein, the analysis server may receive a first BAT of $25, a second BAT of $35, a third BAT of $40, and fourth BAT of $50 corresponding to the first node 512, the second node 514, the fourth node 522, and the fifth node 524, respectively. The analysis server may receive a first transaction of $10 and map the first transaction on a first day to the $60 of the first BAT group 510. The analysis server may receive a second transaction of $15 and map the second transaction on the first day to the $90 of the second BAT group 520. The analysis server may record a total of the first BAT group 510 as $60 and a total of the second group as $90.

On a second day, the analysis server may adjust the mapping of the first transaction to map the first transaction to the first BAT, the second BAT, and the third BAT, causing the first BAT group 510 on the second day to include the first node 512, the second node 514, the fourth node 522, and the fifth node 524, as shown in FIGS. 6A/B. Based on the adjustment of the first BAT group 510 and the inclusion of the fourth node 522 and the fifth node 524 being included in the first BAT group 510, the analysis server may reverse the calculation of the totals of the first BAT group 510 and the second BAT group 520 such that the first transaction is not counted twice in two groups. Thus, by connecting BATs across groups and connecting separate groups based on the connections, the graph 500 ensures that BATs sharing a common transaction are part of a common group, ensuring that transactions are not counted twice. Thus, the $10 of the first transaction is counted once and only once in the modified first BAT group 510.

FIG. 7 illustrates a flowchart depicting operations of a method 700 for tracking funds, according to an embodiment. The method may include using a nodal data structure, such as a graph, to track transactions across BATs. The transactions and/or the BATs may be received across multiple days and the transactions may be mapped to the BATs on the multiple days. Method may include generating a nodal data structure and tracking BAT groups using the nodal data structure, as shown in FIGS. 5 and 6A-B. The method 700 may include more, fewer, or different operations than shown. The operations may be performed in the order shown, a different order, or concurrently. The method 700 may be performed by one or more components of the computing system 100 of FIG. 1, such as the analysis server 110.

At 710, a nodal data structure is generated including a set of nodes where each node represents at least one data point associated with transaction data. In some implementations, the at least one data point is a BAT. In some implementations, the nodal data structure is generated based on one or more BATs received, such that a node is generated for each of the one or more BATs received.

At 720, in response to receiving a first set of transaction data corresponding to aggregated data associated with a first set of transactions, a first subset of the set of nodes is associated with the first set of transaction data. The first set of transaction data may include a plurality of transactions, where funds associated with the plurality of transactions were received in one or more BATs represented by nodes in the first subset of nodes. The first subset of the set of nodes may be associated with the first set of transactions based on the first set of transactions being mapped to the first subset of the set of nodes.

In some implementations, the first set of transaction data includes an indication of a split of funds between two or more entities. In an example, the first set of transaction data includes a split of funds between a transaction processing entity and a merchant entity for each transaction in the transaction data.

At 730, responsive to receiving a second set of transaction data corresponding to aggregated data associated with a second set of transactions and at least a subset of the first set of transactions, a second subset of the set of nodes is associated with the first set of transaction data. The second set of transaction data may include a plurality of transactions, where funds associated with the plurality of transactions were received in one or more BATs represented by nodes in the second subset of nodes. The second subset of the set of nodes may be associated with the second set of transactions based on the second set of transactions being mapped to the second subset of the set of nodes.

At 740, a request is received to identify data associated with a transaction from the first set of transactions. The request may be a request to map the transaction to one or more nodes of the nodal data structure. The request may be a request to modify previous mappings of the transaction to one or more nodes of the nodal data structure. The transaction may be mapped to the first subset based on funds of the transaction being received in the BAT corresponding to a node in the first subset. The transaction may be mapped to the second subset based on funds of the transaction being received in the BAT corresponding to a node in the second subset.

In some implementations, the first set of transaction data is received on a first day and the second set of transaction data is received on a second day. The request to identify data associated with the transaction from the first set of transactions may be in response to receiving the second set of transaction data on the second day. The request to identify data associated with the transaction from the first set of transactions may be to verify an accuracy of the association between the first subset of the set of nodes and the first set of transaction data. In an example, a second transaction is received on the second day which may be associated with the first subset of the set of nodes and the second subset of the set of nodes, prompting the request to identify data associated with the transaction to determine whether the transaction should be associated with the first subset of the set of nodes and the second subset of the set of nodes based on the second transaction being associated with the first subset of the set of nodes and the second subset of the set of nodes.

At 750, the first subset of the set of nodes and the second subset of the set of nodes are combined. In some implementations, the first subset and the second subset are combined based on the transaction being mapped to the first subset and the second subset. In some implementations, combining the first subset and the second subset includes connecting, in the nodal data structure, the first subset and the second subset. In some implementations, combining the first subset of the set of nodes and the second subset of the set of nodes includes connecting at least one node of the first subset of the set of nodes with at least one node of the second subset of the set of nodes. In an example, the first subset and the second subset are connected by an edge in a graph such that the first subset and the second subset are connected.

At 760, an analytical protocol is executed to identify data associated with the transaction. The data associated with the transaction may be a mapping of the transaction to one or more nodes of the nodal data structure. The data associated with the transaction may be a modified mapping of the transaction to one or more nodes of the nodal data structure. The transaction may be mapped to the first subset based on funds of the transaction being received in the BAT corresponding to a node in the first subset. The transaction may be mapped to the second subset based on funds of the transaction being received in the BAT corresponding to a node in the second subset. The transaction may be mapped to the first subset and the second subset based on funds of the transaction being received in the BAT corresponding to a node in the first subset and in the BAT corresponding to a node in the second subset.

At 770, the transaction is disassociated with the first subset of the set of nodes. The transaction may be disassociated with the first subset based on the transaction being associated with the first subset and the second subset. The transaction may be disassociated with the first subset to prevent the transaction from being double-counted, as discussed herein. In some implementations, disassociating, by the processor, the transaction with the first subset of the set of nodes includes deleting the mapping of the amount of the transaction to the first subset of the set of nodes. Deleting the mapping of the amount of the transaction may prevent a total associated with the first subset from including the amount of the transaction in order to prevent the amount of the transaction from being double-counted. In an example, the mapping of the amount of the transaction to the first subset of nodes is deleted such that when the first subset of nodes is combined with the second subset of nodes, the amount of the transaction is associated with the combination of the first and second subsets such that the amount of the transaction is not counted in the first subset and in the combination of the first and second subsets.

At 780, the data associated with the transaction identified via the analytical protocol is associated with the first subset of the set of nodes and the second subset of the set of nodes. The data associated with the transaction may be a mapping of the transaction to the first subset and the second subset. In some implementations, associating the data associated with the transaction identified via the analytical protocol with the first subset of the set of nodes and the second subset of the set of nodes includes mapping an amount of the transaction to the first and second subset of the set of nodes.

In some implementations, associating the data associated with the transaction identified via the analytical protocol with the first subset of the set of nodes and the second subset of the set of nodes includes connecting at least one node of the first subset of the set of nodes with at least one node of the second subset of the set of nodes. In some implementations, the nodal data structure includes a graph, and connecting the at least one node of the first subset of the set of nodes with the at least one node of the second subset of the set of nodes includes adding, to the graph, an edge connecting the at least one node of the first subset of the set of nodes with the at least one node of the second subset of the set of nodes.

The method 700 may further include generating additional data based on the first subset of nodes being assigned to the first set of transaction data. The method 700 may further include modifying the additional data based on the data associated with the transaction being associated with the first subset of the set of nodes and the second subset of the set of nodes. In some implementations, modifying the additional data includes reversing at least one calculation performed in generating the additional data. In some implementations, the additional data includes a mapping of an amount of the transaction to the first subset of the set of nodes.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for deduplicating data records and creating efficiencies for data queries using a nodal graph data structure, to improve computer functioning by conserving memory and compute resources and avoiding computationally intensive redundant calculations, the method comprising executing, by one or more processors, operations comprising:

generating, the nodal graph data structure comprising a set of nodes where each node represents an aggregation of network operation data associated with network operations, wherein the nodal graph data structure is configured to prevent double-counting of network operations by ensuring each network operation is allocated to only one network operation data aggregation group within the nodal graph data structure;

executing a union-find algorithm to detect, in the nodal graph data structure, first instances of network operations being associated with a first subset of the set of nodes and second instances of the network operations being associated with the first subset and a second subset of the set of nodes;

responsive to detecting, in the nodal graph data structure, the first instances of the network operations and the second instances of the network operations:

forming a network operation data aggregation group comprising the first subset of the set of nodes and the second subset of the set of nodes by adding, in the nodal graph data structure, an edge connecting the first subset of the set of nodes and the second subset of the set of nodes, wherein adding the edge allows the processor to efficiently retrieve data without moving or retrieving underlying network operation data;

disassociating, the first instances of the network operations with the first subset of the set of nodes to prevent duplicated instances of the network operations in query responses and to prevent double-counting of the network operation in the nodal graph data structure; and storing an aggregate ratio of values for the network operation data aggregation group to be used; and responsive to receiving a query request to identify a ratio of values for a network operation of the network operations:

generating a response to the query request by traversing the nodal graph data structure to identify the network operation data aggregation group, wherein tracking data associated with the network operation data aggregation group in the nodal graph data structure requires less computing power than tracking the first set of network operation data and the second set of network operation data as raw data; and applying the aggregate ratio of values for the network operation data aggregation group to the network operation, wherein calculating the ratio of values based on the nodal graph data structure conserves memory and compute resources compared to calculating the ratio of values based on the underlying first set of network operation data and second set of network operation data, and wherein the nodal graph data structure prevents redundant calculations that would otherwise be required for each aggregation of network operation data.

2. The method of claim 1, wherein the network operation data includes an indication of a split of network values between two or more entities.

3. The method of claim 1, further comprising generating additional data based on the first instances of network operations being associated with the first subset of the set of nodes.

4. The method of claim 3, further comprising modifying the additional data based on the first instances of network operations being associated with the first subset of the set of nodes and the second subset of the set of nodes.

5. The method of claim 4, wherein modifying the additional data comprises reversing at least one calculation performed in generating the additional data.

6. The method of claim 3, wherein the additional data includes a mapping of an amount of the first instances of the network operations to the first subset of the set of nodes.

7. The method of claim 6, wherein disassociating, the first instances of the network operations with the first subset of the set of nodes includes deleting the mapping of the amount of the first instances of network operations to the first subset of the set of nodes.

8. The method of claim 1, further comprising mapping an amount of the first instances of the network operations to the first and second subsets of the set of nodes.

9. A system comprising one or more processors and a non-transitory, computer readable medium comprising instructions which, when executed by the one or more processors, cause the one or more processors to:

generate a nodal graph data structure comprising a set of nodes where each node represents an aggregation of network operation data associated with network operations, wherein the nodal graph data structure is configured to prevent double-counting of network operations by ensuring each network operation is allocated to only one network operation data aggregation group within the nodal graph data structure;

detect, in the nodal graph data structure, first instances of network operations being associated with a first subset of the set of nodes and second instances of the network operations being associated with the first subset and a second subset of the set of nodes:

responsive to detecting, in the nodal graph data structure, the first instances of the network operations and the second instances of the network operations:

form a network operation data aggregation group comprising the first subset of the set of nodes and the second subset of the set of nodes by adding, in the nodal graph data structure, an edge connecting the first subset of the set of nodes and the second subset of the set of nodes, wherein adding the edge allows the processor to efficiently retrieve data without moving or retrieving underlying network operation data;

disassociate the first instances of the network operations with the first subset of the set of nodes to prevent duplicated instances of the network operations in query responses and to prevent double-counting of the network operation in the nodal graph data structure; and store an aggregate ratio of values for the network operation data aggregation group to be used; and responsive to receiving a query request to identify a ratio of values for a network operation of the network operations:

generate a response to the query request by traversing the nodal graph data structure to identify the network operation data aggregation group and applying the aggregate ratio of values for the network operation data aggregation group to the network operation, wherein tracking data associated with the network operation data aggregation group in the nodal graph data structure requires less computing power than tracking the first set of network operation data and the second set of network operation data as raw data.

10. The system of claim 9, wherein the network operation data includes an indication of a split of network values between two or more entities.

11. The system of claim 9, wherein the instructions further cause the one or more processors to generate additional data based on the first instances of network operations being associated with the first subset of the set of nodes.

12. The system of claim 11, wherein the instructions further cause the one or more processors to modify the additional data based on the first instances of network operations being associated with the first subset of the set of nodes and the second subset of the set of nodes.

13. The system of claim 12, wherein the instructions cause the one or more processors to modify the additional data by reversing at least one calculation performed in generating the additional data.

14. The system of claim 11, wherein the additional data includes a mapping of an amount of the first instances of the network operations to the first subset of the set of nodes.

15. The system of claim 14, wherein the instructions cause the one or more processors to disassociate the first instances of network operations with the first subset of the set of nodes by deleting the mapping of the amount of the first instances of network operations to the first subset of the set of nodes.

16. The system of claim 9, wherein the instructions cause the one or more processors to map an amount of the first instances of network operations to the first and second subsets of the set of nodes.

* * * * *